(12) United States Patent
Wu et al.

(10) Patent No.: US 8,026,040 B2
(45) Date of Patent: *Sep. 27, 2011

(54) SILICONE COATING COMPOSITION

(75) Inventors: Hengpeng Wu, Hillsborough, NJ (US);
WooKyu Kim, Bridgewater, NJ (US);
Hong Zhuang, Raritan, NJ (US);
PingHung Lu, Bridgewater, NJ (US);
Mark Neisser, Whitehouse Station, NJ (US); David Abdallah, Bernardsville, NJ (US); Ruzhi Zhang, Pennington, NJ (US)

(73) Assignee: AZ Electronic Materials USA Corp., Somerville, NJ (US)

( * ) Notice: Subject to any disclaimer, the term of this patent is extended or adjusted under 35 U.S.C. 154(b) by 235 days.

This patent is subject to a terminal disclaimer.

(21) Appl. No.: 11/676,673

(22) Filed: Feb. 20, 2007

(65) Prior Publication Data

US 2008/0196626 A1 Aug. 21, 2008

(51) Int. Cl.
*G03F 7/40* (2006.01)
*G03F 7/075* (2006.01)
*G03F 7/11* (2006.01)

(52) U.S. Cl. ............... 430/272.1; 522/146; 430/325; 430/326; 430/311; 430/313; 525/418

(58) Field of Classification Search ............ 438/952
See application file for complete search history.

(56) References Cited

U.S. PATENT DOCUMENTS

| | | | |
|---|---|---|---|
| 2,310,605 A | 2/1943 | Barnett | |
| 2,779,749 A | 1/1947 | Wicklatz | |
| 2,794,014 A | 5/1947 | Dreisbach et al. | |
| 2,625,525 A | 1/1953 | Lynch | |
| 2,703,793 A | 3/1955 | Naylor | |
| 2,778,812 A | 1/1957 | Dreisbach et al. | |
| 2,899,412 A | 8/1959 | Caldwell et al. | |
| 2,943,077 A | 6/1960 | de Jong et al. | |
| 3,313,785 A | 4/1967 | Zutty | |
| 3,318,844 A | 5/1967 | Krantz | |
| 3,474,054 A | 10/1969 | White | |
| 3,663,507 A | 5/1972 | Vogel et al. | |
| 3,792,026 A | 2/1974 | Atkins et al. | |
| 3,884,696 A | 5/1975 | Bowden et al. | |
| 3,890,287 A | 6/1975 | Moore et al. | |
| 3,893,127 A | 7/1975 | Kaplan et al. | |
| 3,898,350 A | 8/1975 | Gipstein et al. | |
| 3,935,331 A | 1/1976 | Poliniak et al. | |
| 3,935,332 A | 1/1976 | Poliniak et al. | |
| 4,045,318 A | 8/1977 | Himica et al. | |
| 4,097,618 A | 6/1978 | Poliniak | |
| 4,126,712 A | 11/1978 | Poliniak et al. | |
| 4,153,741 A | 5/1979 | Poliniak et al. | |
| 4,200,729 A | 4/1980 | Calbo | |
| 4,251,665 A | 2/1981 | Calbo | |
| 4,267,257 A | 5/1981 | Poliniak et al. | |
| 4,289,845 A | 9/1981 | Bowden et al. | |
| 4,341,861 A | 7/1982 | Pampalone | |
| 4,355,094 A | 10/1982 | Pampalone et al. | |
| 4,393,160 A | 7/1983 | Pampalone | |
| 4,396,702 A | 8/1983 | Desai et al. | |
| 4,397,938 A | 8/1983 | Desai et al. | |
| 4,397,939 A | 8/1983 | Kilichowski | |
| 4,398,001 A | 8/1983 | Cheng et al. | |
| 4,405,776 A | 9/1983 | Pampalone et al. | |
| 4,409,317 A | 10/1983 | Shiraishi | |
| 4,491,628 A | 1/1985 | Ito et al. | |
| 4,504,372 A | 3/1985 | Kirchmayr et al. | |
| 4,751,168 A | 6/1988 | Tsuchiya et al. | |
| 4,808,697 A | 2/1989 | Drent | |
| 4,985,342 A * | 1/1991 | Muramoto et al. | 430/280.1 |
| 4,996,136 A | 2/1991 | Houlihan et al. | |
| 5,072,024 A * | 12/1991 | Cesa et al. | 564/130 |
| 5,100,503 A | 3/1992 | Allman et al. | |
| 5,135,838 A | 8/1992 | Houlihan et al. | |
| 5,187,019 A | 2/1993 | Calbo et al. | |
| 5,200,544 A | 4/1993 | Houlihan et al. | |
| 5,290,354 A * | 3/1994 | Haluska | 106/479 |
| 5,298,367 A | 3/1994 | Hoessel et al. | |
| 5,314,978 A | 5/1994 | Kim et al. | |
| 5,384,376 A | 1/1995 | Tunney et al. | |
| 5,457,003 A | 10/1995 | Tanaka et al. | |

(Continued)

FOREIGN PATENT DOCUMENTS

CN 1714316 A 12/2005

(Continued)

OTHER PUBLICATIONS

Baney et al. "Silsesquioxanes", Chem. Rev. 1995 (American Chemical Society), pp. 1409-1430.*

March, Jerry, Advanced Organic Chemistry: reactions, mechanisms, and structure, second edition, (McGraw-Hill Book Company, New York, NY 1977, pp. 809, 810 and 1302.*

"Sulfonium: Definition from Answers.com" downloaded on Aug. 30, 2010 from http://www.answers.com/topic/sulfonium, 5 pages.*

(Continued)

*Primary Examiner* — Cynthia Hamilton

(74) *Attorney, Agent, or Firm* — Alan P. Kass; Sangya Jain

(57) ABSTRACT

The present invention relates to a composition comprising:

(a) a polymer having at least one repeating unit of formula

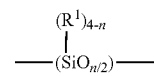

where $R^1$ is a non-hydrolysable group and n is an integer ranging from 1 to 3; and (b) a crosslinking catalyst. The composition is useful in forming low k dielectric constant materials and as well as hard mask and underlayer materials with anti-reflective properties for the photolithography industry.

13 Claims, No Drawings

U.S. PATENT DOCUMENTS

| | | | |
|---|---|---|---|
| 5,562,653 | A | 10/1996 | Thompson |
| 5,728,506 | A | 3/1998 | Kometani |
| 5,843,624 | A | 12/1998 | Houlihan et al. |
| 5,853,808 | A | 12/1998 | Arkles et al. |
| 5,871,872 | A * | 2/1999 | Matijevic et al. .................. 430/7 |
| 5,918,147 | A | 6/1999 | Filipiak et al. |
| 5,919,598 | A | 7/1999 | Flailm et al. |
| 5,926,740 | A | 7/1999 | Forbes et al. |
| 6,069,259 | A | 5/2000 | Crivello |
| 6,087,064 | A | 7/2000 | Lin et al. |
| 6,139,920 | A | 10/2000 | Smith et al. |
| 6,218,292 | B1 | 4/2001 | Foote |
| 6,225,019 | B1 | 5/2001 | Matsuda et al. |
| 6,265,073 | B1 | 7/2001 | Nakamura et al. |
| 6,340,734 | B1 | 1/2002 | Lin et al. |
| 6,379,014 | B1 | 4/2002 | Li et al. |
| 6,420,088 | B1 | 7/2002 | Angelopoulos et al. |
| 6,428,894 | B1 | 8/2002 | Babich et al. |
| 6,447,980 | B1 | 9/2002 | Rahman et al. |
| 6,479,212 | B1 | 11/2002 | Matsuda et al. |
| 6,479,879 | B1 | 11/2002 | Pike et al. |
| 6,515,073 | B2 | 2/2003 | Sakamoto et al. |
| 6,576,393 | B1 | 6/2003 | Sugita et al. |
| 6,590,705 | B1 | 7/2003 | Allen et al. |
| 6,596,404 | B1 | 7/2003 | Albaugh et al. |
| 6,723,488 | B2 | 4/2004 | Kudo et al. |
| 6,730,454 | B2 | 5/2004 | Pfeiffer et al. |
| 6,737,117 | B2 | 5/2004 | Boisvert et al. |
| 6,770,726 | B1 | 8/2004 | Arkles et al. |
| 6,773,864 | B1 | 8/2004 | Thackeray et al. |
| 6,790,587 | B1 | 9/2004 | Feiring et al. |
| 6,803,171 | B2 | 10/2004 | Gronbeck et al. |
| 6,818,250 | B2 | 11/2004 | George et al. |
| 6,818,258 | B2 | 11/2004 | Kaneko et al. |
| 6,824,947 | B2 | 11/2004 | Ishizuka et al. |
| 6,849,377 | B2 | 2/2005 | Feiring et al. |
| 6,866,984 | B2 | 3/2005 | Jung et al. |
| 6,914,114 | B2 | 7/2005 | Baldwin et al. |
| 6,916,543 | B2 | 7/2005 | De et al. |
| 6,916,590 | B2 | 7/2005 | Kaneko et al. |
| 6,919,114 | B1 | 7/2005 | Darras et al. |
| 6,939,664 | B2 | 9/2005 | Huang et al. |
| 6,939,753 | B2 | 9/2005 | Lee et al. |
| 6,956,097 | B2 | 10/2005 | Kennedy et al. |
| 7,033,729 | B2 | 4/2006 | Jung et al. |
| 7,108,958 | B2 | 9/2006 | Guerrerro |
| 7,115,532 | B2 | 10/2006 | Daley et al. |
| 7,223,517 | B2 | 5/2007 | Babich et al. |
| 7,264,913 | B2 | 9/2007 | Wu et al. |
| 7,300,730 | B1 | 11/2007 | Wlllis et al. |
| 7,416,834 | B2 | 8/2008 | Abdallah et al. |
| 7,625,687 | B2 | 12/2009 | Hu et al. |
| 7,662,985 | B2 | 2/2010 | Yamahiro et al. |
| 7,691,556 | B2 | 4/2010 | Wu et al. |
| 7,704,670 | B2 | 4/2010 | Abdallah et al. |
| 7,736,837 | B2 | 6/2010 | Abdallah et al. |
| 7,816,071 | B2 | 10/2010 | Abdallah et al. |
| 2001/0034427 | A1 | 10/2001 | Jung et al. |
| 2001/0036998 | A1 | 11/2001 | Sakamoto et al. |
| 2002/0012876 | A1 | 1/2002 | Angelopoulos et al. |
| 2002/0042020 | A1 | 4/2002 | Gallagher et al. |
| 2002/0094593 | A1 | 7/2002 | Chiou et al. |
| 2002/0128388 | A1 | 9/2002 | Kennedy et al. |
| 2002/0198269 | A1 | 12/2002 | Zampini et al. |
| 2003/0092854 | A1 | 5/2003 | Yahagi et al. |
| 2003/0120018 | A1 | 6/2003 | Baldwin et al. |
| 2003/0148213 | A1 | 8/2003 | Kaneko et al. |
| 2003/0198877 | A1 | 10/2003 | Pfeiffer et al. |
| 2003/0209515 | A1 | 11/2003 | Pavelchek |
| 2003/0219678 | A1 | 11/2003 | Harada et al. |
| 2004/0013980 | A1 | 1/2004 | Hatakeyama et al. |
| 2004/0014322 | A1 | 1/2004 | Hwang et al. |
| 2004/0137241 | A1 * | 7/2004 | Lin et al. ..................... 428/447 |
| 2004/0176488 | A1 | 9/2004 | Mukherjee et al. |
| 2004/0247900 | A1 | 12/2004 | Ogihara et al. |
| 2004/0253461 | A1 | 12/2004 | Ogihara et al. |
| 2004/0253535 | A1 | 12/2004 | Cameron et al. |
| 2005/0031964 | A1 | 2/2005 | Babich et al. |
| 2005/0054216 | A1 | 3/2005 | Daley |
| 2005/0058929 | A1 | 3/2005 | Kennedy et al. |
| 2005/0118541 | A1 | 6/2005 | Ahn et al. |
| 2005/0123760 | A1 | 6/2005 | Cammack et al. |
| 2005/0277058 | A1 | 12/2005 | Iwabuchi et al. |
| 2005/0277756 | A1 | 12/2005 | Iwabuchi et al. |
| 2006/0058489 | A1 | 3/2006 | Angelopoulos et al. |
| 2006/0105181 | A1 | 5/2006 | Lin et al. |
| 2006/0141400 | A1 | 6/2006 | Hirayama et al. |
| 2006/0141693 | A1 | 6/2006 | Hagiwara et al. |
| 2006/0194916 | A1 | 8/2006 | Zhong et al. |
| 2006/0252277 | A1 | 11/2006 | Daley |
| 2006/0287454 | A1 | 12/2006 | Yamhiro et al. |
| 2006/0292488 | A1 | 12/2006 | Takayama et al. |
| 2007/0015977 | A1 | 1/2007 | McCann et al. |
| 2007/0042289 | A1 | 2/2007 | Thackeray et al. |
| 2007/0057253 | A1 | 3/2007 | Gronbeck et al. |
| 2007/0097514 | A1 | 5/2007 | Matsuzawa et al. |
| 2007/0117044 | A1 | 5/2007 | Ogihara et al. |
| 2007/0117411 | A1 | 5/2007 | Ogihara et al. |
| 2007/0225465 | A1 * | 9/2007 | Akiike et al. .................. 528/15 |
| 2007/0238300 | A1 | 10/2007 | Ogihara et al. |
| 2007/0261600 | A1 | 11/2007 | Zhong |
| 2007/0298349 | A1 | 12/2007 | Zhang et al. |
| 2008/0008954 | A1 * | 1/2008 | Abdallah et al. ........... 430/270.1 |
| 2008/0008955 | A1 | 1/2008 | Brodsky et al. |
| 2008/0020319 | A1 | 1/2008 | Yeh et al. |
| 2008/0026322 | A1 | 1/2008 | Ogihara et al. |
| 2008/0311530 | A1 | 12/2008 | Allen et al. |
| 2009/0105360 | A1 | 4/2009 | Niwa et al. |
| 2009/0123701 | A1 | 5/2009 | Fu et al. |
| 2009/0130595 | A1 * | 5/2009 | Kawana et al. ............ 430/272.1 |
| 2009/0162800 | A1 | 6/2009 | Abdallah et al. |
| 2009/0253884 | A1 | 10/2009 | Ogawa et al. |
| 2009/0253886 | A1 | 10/2009 | Nishikawa |
| 2009/0274974 | A1 | 11/2009 | Abdallah et al. |
| 2010/0092895 | A1 | 4/2010 | Zhang et al. |
| 2010/0093969 | A1 | 4/2010 | Zhang et al. |
| 2010/0291475 | A1 | 11/2010 | Li |

FOREIGN PATENT DOCUMENTS

| | | |
|---|---|---|
| EP | 1 178 354 A1 | 2/2002 |
| EP | 1 905 795 A1 | 4/2008 |
| GB | 744264 | 9/1952 |
| GB | 757046 | 4/1953 |
| GB | 1118950 | 11/1964 |
| JP | 5-125187 A | 5/1993 |
| JP | 2002-179793 A | 2/2002 |
| JP | 2005-48152 A | 2/2005 |
| JP | 2005-128509 A | 5/2005 |
| JP | 2005-221534 A | 8/2005 |
| JP | 2007-279459 A | 10/2007 |
| KR | 10-2007-0002602 | 1/2007 |
| WO | WO 86/05284 A1 | 9/1986 |
| WO | WO 00/77575 A1 | 12/2000 |
| WO | WO 03/044079 A1 | 5/2003 |
| WO | WO 2004/044025 A2 | 5/2004 |
| WO | WO 2004/046224 A1 | 6/2004 |
| WO | WO 2004/113417 A1 | 12/2004 |
| WO | WO 2005/037907 A1 | 4/2005 |
| WO | WO 2005/049681 A2 | 6/2005 |
| WO | WO-2005/100445 A1 * | 10/2005 |
| WO | WO 2006/107029 A1 | 10/2006 |
| WO | WO-2006/132089 A1 * | 12/2006 |

OTHER PUBLICATIONS

Notification of Transmittal of the International Search Report and the Written Opinion of the International Searching Authority or the Declaration (Form PCT/ISA/220), International Search Report (Form PCT/ISA/210), and Written Opinion of the International Searching Authority (Form PCT/ISA/237) for PCT application PCT/IB2007/01846.
Derwent Abstract XP-002147398.
English Language Abstract of JP 5-125187 A.
English Language Abstract of JP 2006-312717 A.
Machine Language English Translation of JP 5-125187 A from Japanese Patent Office.
Machine Language English Translation of JP 2006-312717 A from Japanese Patent Office.

Office Action date mailed Feb. 17, 2009 for U.S. Appl. No. 11/425,813.
Office Action dated mailed Feb. 4, 2008 from related application U.S. Appl. No. 11/372,680.
English Language Abstract of JP 2002-179793 A.
Jiang, Y. et al., "Design and synthesis of thermally labile polymers for microelectronics: poly(vinyl tert-butyl carbonate sulfone)", Macromolecules (1991) vol. 24, No. 12, pp. 3528-pp. 3532.
Jiang, Y. et al., "Poly(vinyl-tl-butyl carbonate) synthesis and thermolysis to poly(vinyl alcohol)", Polymer Bulletin (1987) vol. 17, pp. 1-pp. 6.
Houlihan, F. et al., "Phase transfer catalysis in the tert-butyloxycarbonylation of alcohols, phenols, enols, and thiols with di-tert-butyl dicarbonate", Can. J. Chem. (1985), vol. 63, pp. 153-pp. 162.
Pages 41 and 42 from Gelest Reactive Silicones Catalog, copyright 2004.
Pages 15 to 24 of Jun. 5, 2006 Chemical & Engineering News.
Office Action date mailed Oct. 13, 2009 for U.S. Appl. No. 11/425,813.
Office Action date mailed Sep. 16, 2009 for U.S. Appl. No. 11/425,817.
Form PCT/IB/326, Form PCT/IB/373, and Form PCT/ISA/237 for PCT/IB2008/000432 dated Sep. 3, 2009 which corresponds to U.S. Appl. No. 11/676,673.
Notification of Transmittal of the International Search Report and the Written Opinon of the International Searching Authority, or the Declaration (Form PCT/ISA/220), International Search Report (Form PCT/ISA/210), and Written Opinion of the International Searching Authority (Form PCT/ISA/237) for PCT/IB2008/003523 dated Jun. 25, 2009.
English Language Abstract of KR 10-2007-0002602, submitted Jul. 8, 2010.
Office Action date mailed Apr. 17, 2008 for U.S. Appl. No. 11/425,813.
Office Action date mailed Nov. 14, 2008 for U.S. Appl. No. 11/425,813.
Form PCT/IB/326, Form PCT/IB/373, and Form PCT/ISA/237 for PCT/IB2007/001982 dated Jan. 8, 2009 which corresponds to U.S. Appl. No. 11/425,813.
Office Action dated Feb. 5, 2009 from U.S. Appl. No. 11/425,817.
Form PCT/IB/326, Form PCT/IB/373, and Form PCT/ISA/237 for PCT/IB2007/001846 dated Jan. 8, 2009 which corresponds to U.S. Appl. No. 11/425,817.
Form PCT/ISA/220, Form PCT/ISA/210, and Form PCT/ISA/237 for PCT/IB2008/000517 dated Aug. 5, 2008 which corresponds to U.S. Appl. No. 11/676,871.
Form PCT/ISA/220, Form PCT/ISA/210, and Form PCT/ISA/237 for PCT/IB2008/000432 dated Jun. 30, 2008 which corresponds to U.S. Appl. No. 11/676,673.
Form PCT/ISA/220, Form PCT/ISA/210, and Form PCT/ISA/237 for PCT/IB2008/000609 dated Jun. 27, 2008 which corresponds to U.S. Appl. No. 12/449,735.
Form PCT/ISA/220, Form PCT/ISA/210, and Form PCT/ISA/237 for PCT/IB2008/000518 dated Aug. 5, 2008 which corresponds to U.S. Appl. No. 11/449,750.
Form PCT/IB/326, Form PCT/IB/373, and Form PCT/ISA/237 for PCT/IB2008/000518 dated Sep. 3, 2009 which corresponds to U.S. Appl. No. 12/449,750.
B. Arkles et al., "High Density Silicon Dioxide Coatings by UV and Thermal Processing", Silicones in Coatings III, Mar. 28-30, 2000, Barcelona, Spain.
B. Arkles et al., "Staged Development of Modified Silicon Dioxide Films", Journal of Sol-Gel Science and Technology vol. 8, pp. 465-pp. 469 (1997).
C.Y. Chang et al., "A Novel Switchable BARC (SBARC) and Process to Improve Pattern Collapse and Defect Control", SPIE vol. 6153, Part 1, pp. 61530M-1-pp. 61530M-10 (2006).
Y. Huo et al., "Synthesis and Properties of Hybrid Organic-Inorganic Materials Containing Covalently Bonded Luminescent Polygermanes", Chem. Mater. vol. 17, pp. 157-pp. 163 (2005).
Kennedy et al., "Organosiloxane based Bottom Antireflective Coatings for 193nm Lithography", SPIE vol. 5039, pp. 929-pp. 939 (2003).
S. Kodama et al., "Synthesis of Novel Fluoropolymer for 157nm Photoresists by Cyclo-polymerization", SPIE vol. 4690, pp. 76-pp. 83 (2002).
Q. Pan et al., "Spin-on-glass thin films prepared from a novel polysilsesquioxane by thermal and ultraviolet-irradiation methods", Thin Solid Films vol. 345, pp. 244-pp. 254 (1999).
Form PCT/IB/326, Form PCT/IB/373, and Form PCT/ISA/237 for PCT/IB2008/003523 dated Jul. 1, 2010, which corresponds to U.S. Appl. No. 11/691,581.
Notification of the First Office Action dated Jan. 10, 2011 for Chinese Patent Application No. 200780023234.6, which corresponds to U.S. Appl. No. 11/676,673.
Office Action date mailed Jul. 21, 2010 for U.S. Appl. No. 11/961,581.
Office Action date mailed Dec. 23, 2009 for U.S. Appl. No. 12/112,221.
Office Action dated Aug. 20, 2010 from U.S. Appl. No. 12/112,221.
Goldfarb et al., "Graded spin-on organic bottom antireflective coating for high NA lithography", SPIE vol. 6923, pp. 69230V-1-pp. 69230V-14 (2008). Downloaded from SPIE Digital Library on Dec. 12, 2009.
Imae et al., "Unique photoluminescence property of a novel perfectly carbazole-substituted POSS", J. Mater. Chem. vol. 5, pp. 4581-pp. 4583 (2005).
Form PCT/IB/326, Form PCT/IB/373, and Form PCT/ISA/237 for PCT/IB2009/005456 dated Nov. 11, 2010, which corresponds to U.S. Appl. No. 12/112,221.
Form PCT/ISA/220, Form PCT/ISA/210, and Form PCT/ISA/237 for PCT/IB2009/005456 dated Oct. 9, 2009, which corresponds to U.S. Appl. No. 12/112,221.
R. E. Cook et al., Effect of Olefin Structure on the Ceiling Temperature for Olefin Polysulfone Formation, Journal of Polymer Science vol. XXVI, pp. 351-pp. 364 (1957).
Notification of the First Office Action dated Apr. 6, 2011 for Chinese Patent Application No. 200880006170.3, which corresponds to U.S. Appl. No. 12/449,750.
Eng. Lang. Translation of Notification of the First Office Action dated Apr. 6, 2011 for Chinese Patent Application No. 200880006170.3, which corresponds to U.S. Appl. No. 12/449,750.
Notification of the Second Office Action dated Jul. 6, 2011 for Chinese Patent Application No. 200780023234.6, which corresponds to U.S. Appl. No. 11/676,673.
English Translation of Notification of the Second Office Action dated Jul. 6, 2011 for Chinese Patent Application No. 200780023234.6, which corresponds to U.S. Appl. No. 11/676,673.
Office Action mail date Aug. 17, 2011 for U.S. Appl. No. 12/464,170.

* cited by examiner

SILICONE COATING COMPOSITION

BACKGROUND OF THE INVENTION

This invention relates generally to high silicon-content resin composition that can be used to form thin film thermosets, useful in forming low k dielectric constant materials and as well as hard mask and underlayer materials with antireflective properties for the photolithography industry.

As the dimensions of microelectronic devices become smaller, the importance of fully exploiting the physical properties of the materials used in their manufacture becomes more essential. This is particularly true of the dielectric materials that are used to insulate metal lines, vias and electronic components from one another because of the contributions to capacitance that these materials make. Silicon dioxide has been employed within the industry as a dielectric material for the manufacture of devices for nearly three decades, but may become less suitable in the future because of its relatively high dielectric constant (k~4.1). Recently, however, siloxanes have made inroads into microlithography fabrication with low dielectric constant insulating layers and pattern transfer hard masks that exhibit antireflective properties.

Additionally, in current conventional semiconductor manufacturing, in order to prevent light reflection from being transmitted through the photo-resist, reflected off the substrate and back into the photoresist, where it can interfere with incoming light and so result in the uneven exposure of the photoresist, conventionally one or more antireflective layers may be deposited before the photoresist is deposited or spun on. In the absence of an antireflection coating, interference of reflected and incident exposure radiation can cause standing wave effects that distort the uniformity of the radiation through the thickness of the photoresist layer. Variations in reflectivity throughout the entire imaged areas can cause undesirable line width variation for features which are designed to have similar dimensions.

SUMMARY OF THE INVENTION

The present invention relates to a composition comprising:
(a) a polymer having at least one repeating unit of formula

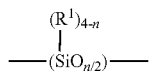

where $R^1$ is a non-hydrolysable group and n is an integer ranging from 1 to 3; and (b) a crosslinking catalyst. The crosslinking catalyst can be represented by the formula $Z^+A^-$, where Z is a cation selected from tetraalkylammonium, tetraalkylphosphonium, trialkylmonoarylammonium, trialkylmonoarylphosphonium, dialkyldiarylammonium, dialkyldiarylphosphonium, monoalkyltriarylammonium, monoalkyltriarylphosphonium, tetraarylammonium, tetraarylphosphonium, unsubstituted or substituted iodonium, and unsubstituted or substituted sulfonium and A is an anion containing a group selected from halide, hypohalite, halite, halate, perhalate, hydroxide, monocarboxylate, dicarboxylate, carbonate, bicarbonate, silanolate, alkoxide, aryloxide, nitrate, azide, peroxymonosulfate, peroxydisulfate, dihydrogen phosphate, phosphate, sulfate, bisulfate, sulfonate, and guanidine, as well as the hydrates thereof, and mixtures thereof, or the crosslinking catalyst can be a sulfuric acid generator which decomposes at a temperature less than or equal to about 500° C. can include sulfuric acid, hydrogen sulfate or sulfate salts of trialkylamine, unsubstituted or substituted dialkylmonocyloalkylamine, unsubstituted or substituted monoalkyldicycloalkylamine, unsubstituted or substituted tricycloalkylamine, triarylamine, unsubstituted or substituted diarylmonoalkylamine, unsubstituted or substituted monoaryldialkylamine, unsubstituted or substituted triarylamine, unsubstituted or substituted aziridine, unsubstituted or substituted azetidine, unsubstituted or substituted pyrrol, unsubstituted or substituted pyridine, unsubstituted or substituted piperidine, or unsubstituted or substituted piperazine, such as triethylamine hydrogen sulfate, tributylamine hydrogen sulfate, piperazine sulfate, and the like.

DETAILED DESCRIPTION OF THE INVENTION

The present invention relates to a composition comprising:
(a) a polymer having at least one repeating unit of formula

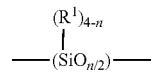

where $R^1$ is a non-hydrolysable group and n is an integer ranging from 1 to 3; and (b) a crosslinking catalyst. The crosslinking catalyst can be represented by the formula $Z^+A^-$, where Z is a cation selected from tetraalkylammonium, tetraalkylphosphonium, trialkylmonoarylammonium, trialkylmonoarylphosphonium, dialkyldiarylammonium, dialkyldiarylphosphonium, monoalkyltriarylammonium, monoalkyltriarylphosphonium, tetraarylammonium, tetraarylphosphonium, unsubstituted or substituted iodonium, and unsubstituted or substituted sulfonium and A is an anion containing a group selected from halide, hypohalite, halite, halate, perhalate, hydroxide, monocarboxylate, dicarboxylate, carbonate, bicarbonate, silanolate, alkoxide, aryloxide, nitrate, azide, peroxymonosulfate, peroxydisulfate, dihydrogen phosphate, phosphate, sulfate, bisulfate, sulfonate, and guanidine, as well as the hydrates thereof, and mixtures thereof, or the crosslinking catalyst can be a sulfuric acid generator which decomposes at a temperature less than or equal to about 500° C. can include sulfuric acid, hydrogen sulfate or sulfate salts of trialkylamine, unsubstituted or substituted dialkylmonocyloalkylamine, unsubstituted or substituted monoalkyldicycloalkylamine, unsubstituted or substituted tricycloalkylamine, triarylamine, unsubstituted or substituted diarylmonoalkylamine, unsubstituted or substituted monoaryldialkylamine, unsubstituted or substituted triarylamine, unsubstituted or substituted aziridine, unsubstituted or substituted azetidine, unsubstituted or substituted pyrrol, unsubstituted or substituted pyridine, unsubstituted or substituted piperidine, or unsubstituted or substituted piperazine, such as triethylamine hydrogen sulfate, tributylamine hydrogen sulfate, piperazine sulfate, and the like.

Curable silicone polymers cure via different mechanisms that mainly include through reactive groups directly attached to Si, such as, for example, silanol (SiOH), alkoxysilane (SiOR), halosilane, vinylsilane, SiH, etc., where curing occurring through those reactive groups are condensation, hydrolysis/condensation, addition, etc. and through reactive groups whose reactivity is not directly dependent of Si, such as, for example, vinyl, hydride, amine, epoxy, carbinol, methacrylate/acrylate, mercapto, etc., where curing occurs through these functional groups in a manner similar to non-Si-containing organic coating compositions bearing the same functional groups.

Curable silicone polymers have widely been used in semiconductor industry as low k materials, hardmask, underlayer, antireflective coating, etc. A large portion of silicone polymers used in this area utilize SiOH/SiOR groups to achieve a highly crosslinked film. However, silicone polymers containing SiOH groups normally suffer from a drawback—insufficient stability caused by condensation of the SiOH groups during storage. If water is present, it can hydrolyze the SiOR groups, leading to similar instability during storage. Applicants have been able to overcome these shortcomings with the present invention which provides a silicone coating composition that has good curing performance and excellent storage stability due to lack of SiOH/SiOR groups.

The term "hydrolysable group" refers to a group which either is directly capable of undergoing condensation reactions under appropriate conditions or which is capable of hydrolyzing under appropriate conditions, thereby yielding a compound, which is capable of undergoing condensation reactions.

Accordingly, the term "non-hydrolysable group" as used in the present invention refers to a group not capable of either directly undergoing condensation reactions under appropriate conditions or of hydrolyzing under the conditions listed above for hydrolyzing the hydrolyzable groups.

Examples of non-hydrolysable groups include, but are not limited to, hydrogen, unsubstituted or substituted alkyl, unsubstituted or substituted monocycloalkyl or polycycloalkyl, unsubstituted or substituted monocyclic or polycyclic aryl, unsubstituted or substituted monocyclic or polycyclic aralkyl, carboxy, and carbinol. Examples of groups which can be used to substitute the aforementioned moieties include carboxy, cyano, halogen, and the like.

Siloxane monomers having the general formula $R^1_m Si(X)_{4-m}$, where each $R^1$ is individually unsubstituted or substituted alkyl or unsubstituted or substituted aryl, X is halogen or $OR^1$, and m is an integer 0 to 3 can be used in the initial formation of the inventive polymer. Examples of such monomers include, for example, (i) when m=0, tetraalkoxysilanes such as tetramethoxysilane, tetraethoxysilane, tetrapropoxysilane and tetrabutoxysilane; (ii) when m=1, monoalkyltrialkoxysilanes such as monomethyltrimethoxysilane, monomethyltriethoxysilane, monomethyltripropoxysilane, monoethyltrimethoxysilane, monoethyltriethoxysilane, monoethyltripropoxysilane, monopropyltrimethoxysilane, 2-cyanoethyltriethoxysilane, 3-chloropropyltrimethoxysilane, monopropyltriethoxysilane; and monophenyltrialkoxysilanes such as monophenyltrimethoxysilane and monophenyltriethoxysilane; (iii) when m=2, dialkyldialkoxysilanes such as dimethyldimethoxysilane, dimethyldiethoxysilane, dimethyldipropoxysilane, diethyldimethoxysilane, diethyldiethoxysilane, diethyldipropoxysilane, dipropyldimethoxysilane, dipropyldiethoxysilane and dipropyldipropoxysilane; and diphenyldialkoxysilanes such as diphenyldimethoxysilane and diphenyldiethoxysilane; and (iv) when m=3, trialkylmonoalkoxysilanes such as trimethylmethoxysilane, triethylethoxysilane, and the like.

After forming the above polymer, the polymer, which can contain Si—OH and Si—$OR^1$ groups, and sometimes Si-halogen, is then hydrolyzed, for example by contacting it (for example, being precipitated into) with water, which causes hydrolysis of any Si—$OR^1$ moieties and, if present, Si-halogen, into Si—OH. The precipitated polymer, having only Si—OH groups, is then further reacted with a capping agent which further react with the Si—OH moieties in the polymer until the presence of any Si—OH groups are not seen. Examples of the capping agent include, but are not limited to, a compound having the formula $R^a_3Si(R^b)$ where each $R^a$ is individually unsubstituted or substituted alkyl or unsubstituted or substituted aryl and $R^b$ is $OR^a$ or halogen or $(R_{10})_3Si$—Y—$Si(R_{10})_3$, where each $R_{10}$ is selected from $C_{1-4}$ alkyl which is unsubstituted or substituted and $C_{1-4}$ alkoxy which is unsubstituted or substituted, and Y is a linking group selected from —O—, and —$NR_{11}$—, where $R_{11}$ is hydrogen or $C_{1-10}$ unsubstituted and substituted branched or straight chain alkyl, such as unsubstituted or substituted trialkylmonohalogenosilanes, dialkylmonoarylmonohalogenosilanes, and monoalkyldiarylmonohalogenosilanes, and others; for example, bischloromethyltetramethyldisiloxane, 3-cyanopropyldimethylchlorosilane, 1,3-bis(3-carboxypropyl)tetramethyldisiloxane, trimethylchlorosilane, triethylchlorosilane, dimethyl(ethyl)chlorosilane, phenyldimethylmethoxysilane, trimethylethoxysilane, dimethyl(cyclohexyl)chlorosilane, dimethyl(phenyl)chlorosilane, and methyl(diphenyl)chlorosilane, and the like, etc.

Another constituent of the composition is a crosslinking catalyst. Examples of the crosslinking catalyst, which is further described below, include tetraalkylammonium hydroxide and/or tetraalkylphosphonium hydroxide as well as trialkylsulfonium hydroxide and dialkyliodonium hydroxide. The crosslinking catalyst can be a salt of tetraalkylammonium hydroxide and an acid and/or a salt of tetraalkylphosphonium hydroxide and an acid and/or a salt of trisubstituted (with alkyl, aryl, or mixtures thereof) sulfonium hydroxide and an acid and/or a salt of diaryliodonium hydroxide and an acid. The acids can be, for example, an inorganic acid, e.g., sulfuric acid, phosphoric acid, hydrochloric acid, etc., an organic acid, e.g., formic acid, acetic acid, p-toluenesulfonic acid, oxalic acid, etc., or a polymer containing acid groups. The acid can be Si-containing, e.g., 1,3-bis (3-carboxypropyl) tetramethyldisiloxane.

The crosslinking can be represented by the formula $Z^+A^-$, where $Z^+$ is a cation selected from tetraalkylammonium, tetraalkylphosphonium, trialkylmonoarylammonium, trialkylmonoarylphosphonium, dialkyldiarylammonium, dialkyldiarylphosphonium, monoalkyltriarylammonium, monoalkyltriarylphosphonium, tetraarylammonium, tetraarylphosphonium, unsubstituted or substituted iodonium, and unsubstituted or substituted sulfonium and A is an anion containing a group selected from halide, hypohalite, halite, halate, perhalate, hydroxide, monocarboxylate, dicarboxylate, carbonate, bicarbonate, silanolate, alkoxide, aryloxide, nitrate, azide, peroxymonosulfate, peroxydisulfate, dihydrogen phosphate, phosphate, sulfate, bisulfate, sulfonate, and guanidine, as well as the hydrates thereof, and mixtures thereof.

Examples of the above cations include tetramethylammonium, tetrabutylammonium, tetraphenylammonium, tetramethylphosphonium, tetraphenylphosphonium, trimethylphenylammonium, trimethylphenylphosphonium, dimethyldiphenylammonium, dimethyldiphenylphosphonium, triphenylsulfonium, (4-t-butylphenyl)diphenylsulfonium, diphenyiodonium, and bis(4-t-butylphenyl)iodonium) and the like, etc.

For the anion, the anion will contain one of the aforementioned groups or the group itself will be the anion.

Monocarboxylate refers to anions of organic acids containing one carboxy group with the hydrogen removed and include, for example, acetate, formate, proprionate, and the like. Dicarboxylate refers to anions of organic acids containing two carboxy groups where one or both of the hydrogens are removed and include succinate, malonate, monomalonate (where only one hydrogen is removed), adipate, and the like.

The composition wherein (b) the crosslinking catalyst is selected from tetramethylammonium hydroxide, tetramethylphosphonium hydroxide, tetramethylammonium formate, tetramethylphosphonium formate, tetramethylammonium acetate, tetramethylphosphonium acetate, tetramethylammonium proprionate, tetramethylphosphonium proprionate, tetramethylammonium fluoride, tetramethylphosphonium fluoride, tetramethylammonium chloride, tetramethylphosphonium chloride, tetramethylammonium carbonate, tetramethylphosphonium carbonate, tetramethylguanidine, tetramethylammonium peroxymonosulfate, tetramethylphosphonium+peroxymonosulfate, tetramethylammonium peroxydisulfate, tetramethylphosphonium peroxydisulfate, tetramethylammonium azide, tetramethylphosphonium azide, tetrabutylammonium hydroxide, tetrabutylphosphonium hydroxide, tetrabutylammonium formate, tetrabutylphosphonium formate, tetrabutylammonium acetate, tetrabutylphosphonium acetate, tetrabutylammonium proprionate, tetrabutylphosphonium proprionate, tetrabutylammonium fluoride, tetrabutylphosphonium fluoride, tetrabutylammonium chloride, tetrabutylphosphonium chloride, tetrabutylammonium carbonate, tetrabutylphosphonium carbonate, tetrabutylguanidine, tetrabutylammonium peroxymonosulfate, tetrabutylphosphonium peroxymonosulfate, tetrabutylammonium peroxydisulfate, tetrabutylphosphonium peroxydisulfate, tetrabutylammonium azide, tetrabutylphosphonium azide, mono t-butylphenyldiphenylsulfonium malonate, t-butylphenyldiphenylsulfonium acetate, benzyltriethylammonium p-toluenesulfonate, diphenyliodonium bisulfate, the hydrates of the foregoing, and mixtures thereof.

The crosslinking catalyst can also be a sulfuric acid generator which decomposes at a temperature less than or equal to about 500° C., a sulfuric acid generator is a compound that will generate sulfuric acid when heated. Examples of the sulfuric acid generator which decomposes at a temperature less than or equal to about 500° C. can include sulfuric acid, hydrogen sulfate or sulfate salts of trialkylamine, unsubstituted or substituted dialkylmonocyloalkylamine, unsubstituted or substituted monoalkyldicycloalkylamine, unsubstituted or substituted tricycloalkylamine, triarylamine, unsubstituted or substituted diarylmonoalkylamine, unsubstituted or substituted monoaryldialkylamine, unsubstituted or substituted triarylamine, unsubstituted or substituted aziridine, unsubstituted or substituted azetidine, unsubstituted or substituted pyrrol, unsubstituted or substituted pyridine, unsubstituted or substituted piperidine, or unsubstituted or substituted piperazine, such as triethylamine hydrogen sulfate, tributylamine hydrogen sulfate, piperazine sulfate, and the like.

The crosslinking catalyst are well known to those of ordinary skill in the art as is their method of making, which can be based on neutralizing acids with the base of interest.

The composition can contain a solvent. Suitable solvents include for example ketones such as acetone, methyl ethyl ketone, methyl isobutyl ketone, cyclohexanone, isophorone, methyl isoamyl ketone, 2-heptanone 4-hydroxy, and 4-methyl 2-pentanone; $C_1$ to $C_{10}$ aliphatic alcohols such as methanol, ethanol, n-propanol, isopropanol, n-butanol, sec-butanol, phenol, and the like; aromatic group containing-alcohols such as benzyl alcohol; cyclic carbonates such as ethylene carbonate and propylene carbonate; aliphatic or aromatic hydrocarbons (for example, hexane, toluene, xylene, etc and the like); cyclic ethers, such as dioxane and tetrahydrofuran; ethylene glycol; propylene glycol; hexylene glycol; ether alcohols, for example, 1-butoxyethoxy-2-propanol, 3-methyl-3-methoxybutanol, ethylene glycol n-butyl ether, ethylene glycol phenyl ether, ethylene glycol monomethylether, ethylene glycol monoethylether, ethylene glycol propyl ether, diethylene glycol hexyl ether, diethylene glycol monoethyl ether, diethylene glycol monomethyl ether, diethylene glycol monobutyl ether, diethylene glycol monopropyl ether, propylene glycol ethyl ether, propylene glycol isobutyl ether, propylene glycol monomethyl ether, propylene glycol monobutyl ether, propylene glycol monoethyl ether, propylene glycol n-propyl ether, propylene glycol phenyl ether, propylene glycol-t-butyl ether, dipropylene glycol ethyl ether, dipropylene glycol monobutyl ether, dipropylene glycol monomethyl ether, dipropylene glycol monopropyl ether, triethylene glycol ethyl ether, triethylene glycol methyl ether, triethylene glycol n-butyl ether, tripropylene glycol methyl ether, tripropylene glycol n-butyl ether; ethylene glycol alkylether acetates such as methylcellosolve acetate and ethylcellosolve acetate; propylene glycol alkyletheracetates such as propylene glycol methylether acetate, propylene glycol ethylether acetate, propylene glycol propylether acetate, and propylene glycol butylether acetate; propylene glycol alkyletherpropionates such as propylene glycol methyletherpropionate, propylene glycol ethyletherpropionate, propylene glycol propyletherpropionate, and propylene glycol butyletherpropionate; 2-methoxyethyl ether (diglyme); solvents that have both ether and hydroxy moieties such as methoxy butanol, ethoxy butanol, methoxy propanol, and ethoxy propanol; esters such as methyl acetate, ethyl acetate, propyl acetate, and butyl acetate methyl-pyruvate, ethyl pyruvate; ethyl 2-hydroxy propionate, methyl 2-hydroxy 2-methyl propionate, ethyl 2-hydroxy 2-methyl propionate, methyl hydroxy acetate, ethyl hydroxy acetate, butyl hydroxy acetate, methyl lactate, ethyl lactate, propyl lactate, butyl lactate, methyl 3-hydroxy propionate, ethyl 3-hydroxy propionate, propyl 3-hydroxy propionate, butyl 3-hydroxy propionate, methyl 2-hydroxy 3-methyl butanoic acid, methyl methoxy acetate, ethyl methoxy acetate, propyl methoxy acetate, butyl methoxy acetate, methyl ethoxy acetate, ethyl ethoxy acetate, propyl ethoxy acetate, butyl ethoxy acetate, methyl propoxy acetate, ethyl propoxy acetate, propyl propoxy acetate, butyl propoxy acetate, methyl butoxy acetate, ethyl butoxy acetate, propyl butoxy acetate, butyl butoxy acetate, methyl 2-methoxy propionate, ethyl 2-methoxy propionate, propyl 2-methoxy propionate, butyl 2-methoxy propionate, methyl 2-ethoxypropionate, ethyl 2-ethoxypropionate, propyl 2-ethoxypropionate, butyl 2-ethoxypropionate, methyl 2-butoxypropionate, ethyl 2-butoxypropionate, propyl 2-butoxypropionate, butyl 2-butoxypropionate, methyl 3-methoxypropionate, ethyl 3-methoxypropionate, propyl 3-methoxypropionate, butyl 3-methoxypropionate, methyl 3-ethoxypropionate, ethyl 3-ethoxypropionate, propyl 3-ethoxypropionate, butyl 3-ethoxypropionate, methyl 3-propoxypropionate, ethyl 3-propoxypropionate, propyl 3-propoxypropionate, butyl 3-propoxypropionate, methyl 3-butoxypropionate, ethyl 3-butoxypropionate, propyl 3-butoxypropionate, and butyl 3-butoxypropionate; oxyisobutyric acid esters, for example, methyl-2-hydroxyisobutyrate, methyl α-methoxyisobutyrate, ethyl methoxyisobutyrate, methyl α-ethoxyisobutyrate, ethyl α-ethoxyisobutyrate, methyl β-methoxyisobutyrate, ethyl β-methoxyisobutyrate, methyl β-ethoxyisobutyrate, ethyl β-ethoxyisobutyrate, methyl β-isopropoxyisobutyrate, ethyl β-isopropoxyisobutyrate, isopropyl β-isopropoxyisobutyrate, butyl β-isopropoxyisobutyrate, methyl β-butoxyisobutyrate, ethyl β-butoxyisobutyrate, butyl β-butoxyisobutyrate, methyl α-hydroxyisobutyrate, ethyl α-hydroxyisobutyrate, isopropyl α-hydroxyisobutyrate, and butyl α-hydroxyisobutyrate; and other solvents such as dibasic esters, and gamma-butyrolactone; a ketone ether derivative such as diacetone alcohol methyl ether; a ketone alcohol derivative such as acetol or diacetone alcohol; lactones such as butyrolactone; an amide derivative such as dimethylacetamide or dimethylformamide, anisole, and mixtures thereof.

An optional component which can be added to the composition is a porogen, which can be used to reduce the dielectric constant of film formed by the inventive composition. As used herein, by "porogen" is meant any pore-generating compounds, for example, a thermal- and/or radiation-labile organic polymer capable of decomposition to small molecules and subsequent volatilization to form a nanopore thereby). The conditions for forming such porous low-k dielectric layers are well known to those skilled in the art.

Other optional components include photoacid generators and thermal acid generators, the likes of which are well known in the art. Examples of photoacid generators include sulfonium salts, iodonium salts, sulfonyldiazomethanes, N-sulfonyloxyimides, and N-sulfonyloxyoximes. Examples of thermal acid generators include 2,4,4,6-tetrabromocyclohexadienone, benzoin tosylate, 2-nitrobenzyl tosylate, other alkyl esters of organic sulfonic acids.

The composition of the present invention can be coated on the substrate using techniques well known to those skilled in the art, such as dipping, spincoating or spraying. The film thickness of the anti-reflective coating ranges from about 0.01 µm to about 1 µm. The coating can be heated on a hot plate or convection oven or other well known heating methods to remove any residual solvent and induce crosslinking if desired, and insolubilizing the anti-reflective coatings to prevent intermixing between the anti-reflective coating and the photoresist.

There are two types of photoresist compositions, negative-working and positive-working. When negative-working photoresist compositions are exposed image-wise to radiation, the areas of the resist composition exposed to the radiation become less soluble to a developer solution (e.g. a crosslinking reaction occurs) while the unexposed areas of the photoresist coating remain relatively soluble to such a solution. Thus, treatment of an exposed negative-working resist with a developer causes removal of the non-exposed areas of the photoresist coating and the creation of a negative image in the coating, thereby uncovering a desired portion of the underlying substrate surface on which the photoresist composition was deposited.

On the other hand, when positive-working photoresist compositions are exposed image-wise to radiation, those areas of the photoresist composition exposed to the radiation become more soluble to the developer solution (e.g. a rearrangement reaction occurs) while those areas not exposed remain relatively insoluble to the developer solution. Thus, treatment of an exposed positive-working photoresist with the developer causes removal of the exposed areas of the coating and the creation of a positive image in the photoresist coating. Again, a desired portion of the underlying surface is uncovered.

Negative working photoresist and positive working photoresist compositions and their use are well known to those skilled in the art.

A process of the instant invention comprises coating a substrate with a composition of the present invention and heating the substrate on a hotplate or convection oven or other well known heating methods at a sufficient temperature for sufficient length of time to remove the coating solvent, and crosslink the polymer, to a sufficient extent so that the coating is not soluble in the coating solution of a photoresist or in a aqueous alkaline developer. An edge bead remover may be applied to clean the edges of the substrate using processes well known in the art. The heating ranges in temperature from about 70° C. to about 500° C. If the temperature is below 70° C. then insufficient loss of solvent or insufficient amount of crosslinking may take place. A film of a photoresist composition is then coated on top of the anti-reflective coating and baked to substantially remove the photoresist solvent. The photoresist is image-wise exposed and developed in an aqueous developer to remove the treated resist. An optional heating step can be incorporated into the process prior to development and after exposure. The process of coating and imaging photoresists is well known to those skilled in the art and is optimized for the specific type of resist used. The patterned substrate can then be dry etched in a suitable etch chamber to remove the exposed portions of the anti-reflective film, with the remaining photoresist acting as an etch mask.

The substrate can be Si, $SiO_2$, SiON, SiN, p-Si, $\alpha$-Si, SiGe, W, W—Si, Al, Cu, Al—Si, low-k dielectrics, and the like, or in some instances, a carbon-layer (sometimes called a hardmask), for example, an antireflective coating. When the carbon-layer is used, a trilayer system is formed, where the silicon coating formed by the composition of the invention is the middle layer. That is, the carbon-layer is first applied to a substrate, for example, a silicon wafer. After appropriate processing, the silicon coating composition of the invention is applied and processed. Then, the photoresist layer is applied and the entire stack is further processed. Trilayer systems are well known to those skilled in the art.

The following examples provide illustrations of the methods of producing and utilizing the present invention. These examples are not intended, however, to limit or restrict the scope of the invention in any way and should not be construed as providing conditions, parameters or values which must be utilized exclusively in order to practice the present invention. Unless otherwise specified, all parts and percents are by weight.

Synthesis Example 1

180 grams of methyltrimethoxysilane, 120 grams of 2-cyanoethyltriethoxysilane, 36 grams of phenyltrimethoxysilane and 270 grams of glacial acetic acid were charged into a 2 L flask equipped with a thermometer, a cold water condenser and a mechanical stirrer. After the reaction mixture was heated to 80° C., 4 grams of para-toluenesulfonic acid monohydrate dissolved in 31 grams of acetic acid was added. The reaction was maintained at reflux for 17 hrs and then allowed to cool to room temperature. After the reaction solution was cooled to room temperature, the solution was filtered and the filtrate was slowly poured into DI water with stirring, causing polymer to precipitate. The precipitated polymer was filtered, thoroughly washed with DI water and dried at room temperature. FTIR showed that the polymer contained SiOH groups. The polymer was found to be soluble in most organic solvents. However, the polymer became insoluble once dried at elevated temperatures due to further condensation of SiOH groups. The polymer had a Mw of 4566 g/mol and Mn of 2030 g/mol.

Synthesis Example 2

30.2 grams of polymer from Synthesis Example 1 was dissolved in 100 grams of acetone in a 500 mL flask equipped with a thermometer, a cold water condenser and a mechanical stirrer. 16.5 grams of bischloromethyltetramethyldisiloxane and 2.67 grams of 3-cyanopropyldimethylchlorosilane were added and the reaction mixture was refluxed for 16 hrs. The solution was then allowed to cool to room temperature. The cooled solution was then poured into hexane with stirring, causing polymer to precipitate. The polymer obtained was dissolved in acetone, filtered and precipitated in DI water. The polymer obtained was filtered and washed thoroughly with DI water. The polymer (20 g) was finally dried in a vacuum oven at 45° C. for 2 days. FTIR did not detect SiOH groups in the polymer. $^1$H NMR showed that the polymer contained no $SiOCH_2CH_3$ or $SiOCH_3$ groups. The polymer was found soluble in most organic solvents. The polymer had a Mw of 8303 g/mol and Mn of 3301 g/mol.

Synthesis Example 3

70 grams of methyltrimethoxysilane, 30 grams of 3-chloropropyltrimethoxysilane, 14.2 grams of phenyltrimethoxysilane and 108 grams of glacial acetic acid were charged into a 2 L flask equipped with a thermometer, a cold water condenser and a mechanical stirrer. After the reaction mixture was heated to 80° C., 1.4 grams of para-toluenesulfonic acid monohydrate was added. The reaction was maintained at refluxing for 16 hrs and then allowed to cool to room temperature. After the reaction solution was cooled to room temperature, the solution was filtered and the filtrate was slowly poured into DI water with stirring, causing polymer to precipitate. The precipitated polymer was filtered, thoroughly washed with DI water and dried at room temperature. FTIR showed that the polymer contained SiOH groups. The polymer was found to be soluble in most organic solvents. However, the polymer became insoluble once dried at elevated temperatures due to further condensation of SiOH groups.

Synthesis Example 4

30 grams of polymer from Synthesis Example 3, 8 grams of 1,3-bis(3-carboxypropyl)tetramethyldisiloxane and 0.5 grams of para-toluenesulfonic acid monohydrate were dissolved in 120 grams of acetone in a 500 mL flask equipped with a thermometer, a cold water condenser and a mechanical stirrer. The reaction mixture was refluxed for 18 hrs. The solution was then allowed to cool to room temperature. After cooling, the solution was filtered and poured into DI water with stirring, precipitating the polymer. The polymer was filtered and washed thoroughly with DI water. The polymer (18 g) was finally dried in a vacuum oven at 45° C. for 2 days. $^1$H NMR showed that the polymer contained no $SiOCH_3$ groups. The polymer was found to be soluble in most organic solvents. The polymer had an Mw of 6430 g/mol and Mn of 2490 g/mol.

Synthesis Example 4

4.5 grams of sodium hydroxide was dissolved in 100 grams of DI water. Under stirring, to this was slowly added 18.5 grams of silver nitrate dissolved in 50 g of DI water. The precipitated $Ag_2O$ was isolated by filtering and washed thoroughly with DI water and methanol. 16.08 grams of t-butylphenyldiphenylsulfonium bromide was dissolved in about 400 grams of methanol. Under stirring, the freshly prepared $Ag_2O$ was added. Stirring was continued at room temperature for 4 hrs. The solid was filtered out. 3.2 grams of glacial acetic acid was added to the filtrate. The filtrate was concentrated by removing solvents using a rotary evaporator and poured into diethyl ether, resulting in a clear viscous liquid. After the liquid was washed 2 more times with ether, volatiles in it were removed on a rotary evaporator. 13.4 grams of viscous liquid identified as t-butylphenyldiphenymsulfonium acetate were obtained.

Evaluation Example 1

A coating composition was prepared by dissolving 0.5 g of the polymer prepared in Synthesis Example 2 and 0.005 g of tetraethylammonium acetate tetrahydrate in 9.5 grams of mixture of propylene glycol monomethyl ether acetate/propylene glycol monomethyl ether (70:30) (PGMEA/PGME). The solution was then filtered through 0.2 µm filter. A thin film was spin cast on a 4-inch wafer and baked at 200° C. for 90 s. When the wafer was dipped in PGMEA/PGME for 1 min, no film thickness loss was observed, indicating sufficient curing.

Evaluation Example 2

A coating composition was prepared by dissolving 0.5 g of the polymer prepared in Synthesis Example 2 and 0.01 g of t-butylphenyldiphenymsulfonium acetate from Synthesis Example 4 in 9.5 grams of mixture of propylene glycol monomethyl ether acetate/propylene glycol monomethyl ether (70:30) (PGMEA/PGME). The solution was then filtered through 0.2 µm filter. A thin film was spin cast on a 4-inch wafer and baked at 200° C. for 60 s. When the wafer was dipped in PGMEA/PGME for 1 min, no film thickness loss was observed, indicating sufficient curing.

Evaluation Example 3

A coating composition was prepared by dissolving 1.29 g of the polymer prepared in Synthesis Example 2, 0.038 g of 98 wt % sulfuric acid, and 0.019 grams of dicyclohexylamine in 24 grams of mixture of propylene glycol monomethyl ether acetate/propylene glycol monomethyl ether (70:30) (PGMEA/PGME). The solution was then filtered through 0.2 µm filter. A thin film was spin cast on a 4-inch wafer and baked at 240° C. for 60 s. When the wafer was dipped in PGMEA/PGME for 1 min, no film thickness loss was observed, indicating sufficient curing.

Evaluation Example 4

Preparation of Siloxane Formulations:

5 g of poly(phenyl-methylsilsesquioxane) (SST-3PM1 available from Gelest) was diluted with 95 g PGME. Without addition of any salt, this formulation served as a reference (formulation is abbreviated as REF in Table 1). Multiple formulations were made by taking 5 mL aliquots of REF and adding a 1 mL of a 1% salt solution in PGME to each aliquot; the salts used with and their abbreviations are indicated in Table 1. Salt concentrations correspond to 4% by weight of silicone polymer.

Coatings:

Aliquots of the formulations listed in Table 1 were then spin coated onto 4 inch wafers and baked for 60 seconds at temperatures indicated in Table 2. Wafers were partially immersed into PGME for 60 seconds and blown dry with compressed air. The film thickness (FT) was measures in both the un-immersed (FTUI) and immersed (FTI) regions. The data are compiled in Table 2.

TABLE 1

| Salt | Formulation Abbreviation |
| --- | --- |
| Ref, no salt added | REF |
| Tetra-butylphosphonium chloride | TBPC |
| Oxone tetrabutylammonium salt | TBAO |
| Tetra-butylammonium acetate | TBAA |
| Tetra-butylammonium chloride | TBAC |
| Tetra-butylphosphonium chloride | TBPC |
| Tetra-butylammonium azide | TBAazide |

TABLE 2

| Formulation | Bake temp (°C.) | FTUI | FTI | Difference (FTUI − FTI) | % FT Lost |
| --- | --- | --- | --- | --- | --- |
| REF | 250 | 1258.6 | 0 | 1258.6 | 100% |
| TBPC | 250 | 1195.8 | 1139.7 | 56.1 | 5% |
| TBAO | 250 | 1162.4 | 923.4 | 239 | 21% |
| TBAA | 250 | 1191.4 | 1163 | 28.4 | 2% |
| TBAC | 250 | 1169.8 | 1093.3 | 76.5 | 7% |
| TBPC | 200 | 1216.2 | 1163.6 | 52.6 | 4% |
| TBAA | 200 | 1193.8 | 1145.2 | 48.6 | 4% |
| TBAC | 200 | 1201.2 | 1115.3 | 85.9 | 7% |
| TBPC | 150 | 1252.1 | 1080.8 | 171.3 | 14% |
| TBAA | 150 | 1212.8 | 1132.1 | 80.7 | 7% |
| TBAC | 150 | 1231.9 | 1039 | 192.9 | 16% |
| TBAazide | 200 | 1361 | 1321 | 40 | 3% |
| TBAazide | 100 | 1432 | 0 | 1432 | 100% |

Results of Test:

As shown in Table 2, without addition of salts, the silicone film is completely removed from the wafer upon immersion. The addition of salts can create a thermoset which results in most of the film remaining after immersion. Some salts are better than others in curing the film as indicted by the % FT loss; however, some salts such as TBAA and TBAazide, which exhibit good thermosetting behavior are also found to have poor shelf life.

The foregoing description of the invention illustrates and describes the present invention. Additionally, the disclosure shows and describes only certain embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

The invention claimed is:

1. A composition comprising:
(a) a polymer having at least one repeating unit of formula

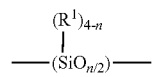

where $R^1$ is a non-hydrolysable group and n is an integer ranging from 1 to 3 where the polymer is capable of being crosslinked with a crosslinking catalyst and further where the polymer is free of SiOH and SiOR groups where R is alkyl; and (b) a crosslinking catalyst which is selected from a compound having the formula $Z^+ A^-$ and its hydrate, where Z is a cation selected from triarylsubstituted sulfonium, trialkylsubstituted sulfonium and a sulfonium which is substituted with a mixture of aryl and alkyl groups, and A is an anion containing a group selected from monocarboxylate and dicarboxylate.

2. The composition of claim 1 wherein the non-hydrolysable group is selected from hydrogen, substituted alkyl, alkyl, substituted monocycloalkyl, monocycloalkyl, polycycloalkyl, substituted polycycloalkyl, substituted monocyclic aryl, monocyclic aryl, substituted polycyclic aryl, polycyclic aryl, substituted monocyclic aralkyl, monocyclic aralkyl, polycyclic aralkyl, substituted polycyclic aralkyl, carboxy, and carbinol.

3. The composition of claim 1 wherein A is selected from acetate, formate, proprionate, succinate, malonate, monomalonate, adipate.

4. The composition of claim 1 which further comprises one or more of the following: photoacid generator, thermal acid generator, surfactant, and porogen.

5. A method of forming an image on a substrate comprising, a) coating the substrate with the composition of claim 1; b) heating the coating of step a); c) forming a coating from a photoresist solution on the coating of step b); d) heating the photoresist coating to substantially remove solvent from the coating; e) image-wise exposing the photoresist coating; f) developing an image using an aqueous alkaline developer; g) optionally, heating the substrate prior to and after development; and h) dry etching the composition of step b).

6. The method of claim 5 wherein the substrate is a carbon-layer/hardmask.

7. The method of claim 5 wherein the substrate is selected from Si, $SiO_2$, SiON, SiN, p-Si, α-Si, W, W—Si, Al, Cu, and Al—Si.

8. A coated substrate comprising: a substrate having thereon; a layer of the composition of claim 1; and a layer of a positive photoresist composition above the composition.

9. The coated substrate of claim 8 wherein the substrate is a carbon-layer/hardmask.

10. The coated substrate of claim 8 wherein the substrate is selected from Si, $SiO_2$, SiON, SiN, p-Si, α-Si, W, W—Si, Al, Cu, and Al—Si.

11. The composition of claim 1 where the non-hydrolysable group is selected from substituted alkyl, alkyl, substituted monocycloalkyl, monocycloalkyl, polycycloalkyl, substituted polycycloalkyl, substituted monocyclic aryl, monocyclic aryl, substituted polycyclic aryl, polycyclic aryl, substituted monocyclic aralkyl, monocyclic aralkyl, polycyclic aralkyl, and substituted polycyclic aralkyl.

12. The composition of claim 1 where the non-hydrolysable group is stable during storage.

13. The composition of claim 1 where the crosslinking catalyst which is selected from a compound having the formula $Z^+ A^-$ and its hydrate, where Z is a cation selected from triphenylsulfonium, (4-t-butylphenyl)diphenylsulfonium, and A is an anion containing a group selected from monocarboxylate and dicarboxylate.

* * * * *